May 8, 1928. 1,668,877

R. D. STROUP

BRAKE MECHANISM

Filed July 26, 1924 3 Sheets-Sheet 1

Inventor
R. D. Stroup
By Sol Shappirio
his Attorney

May 8, 1928. 1,668,877
R. D. STROUP
BRAKE MECHANISM
Filed July 26, 1924 3 Sheets-Sheet 2
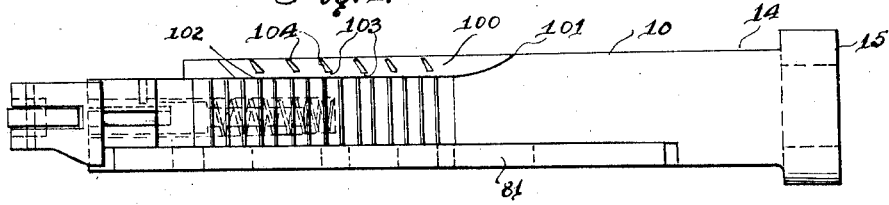
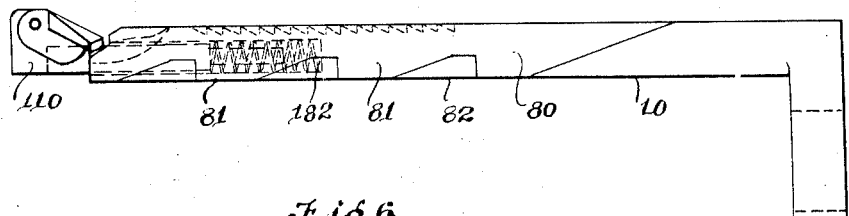
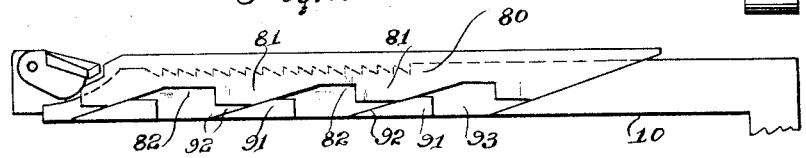
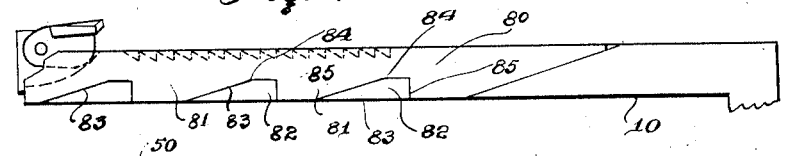
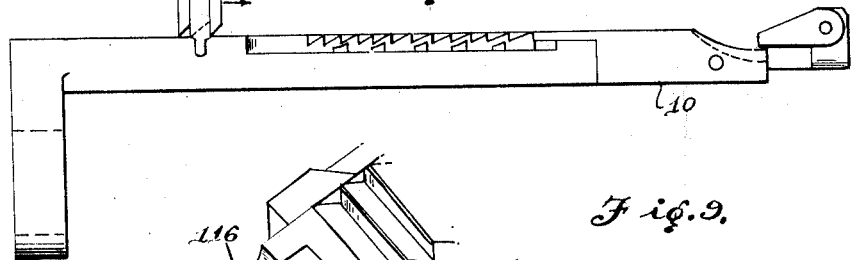
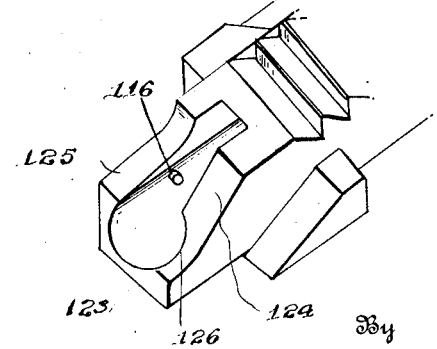
Inventor
R. D. Stroup
By Sol Shappirio
his Attorney May 8, 1928.  1,668,877
R. D. STROUP
BRAKE MECHANISM
Filed July 26, 1924   3 Sheets-Sheet 3
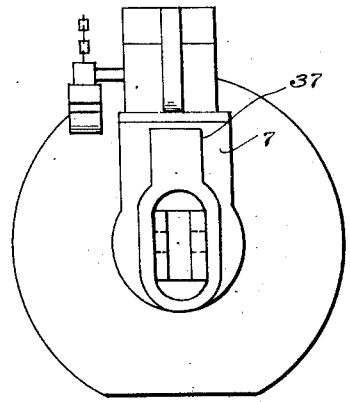
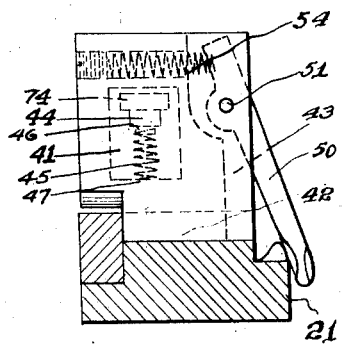
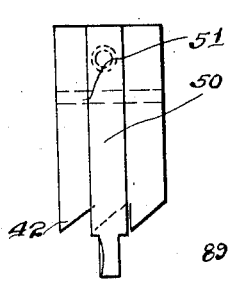
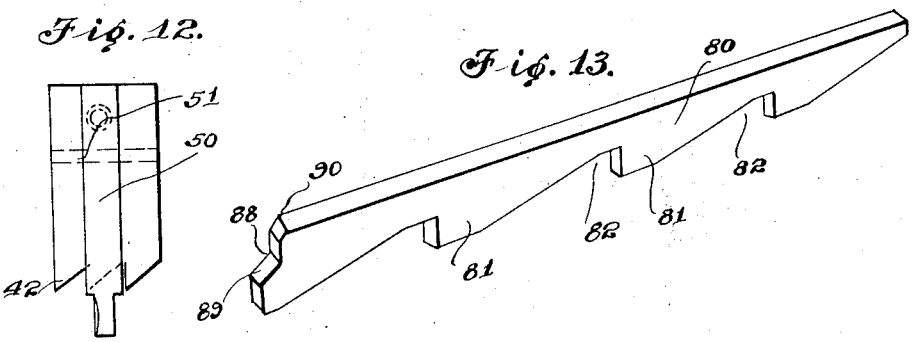
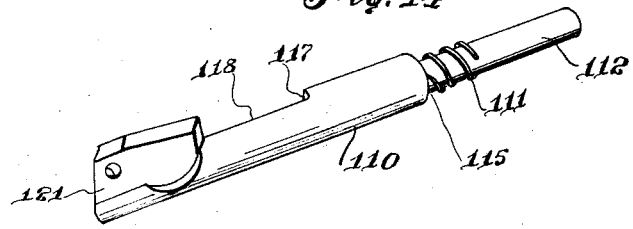
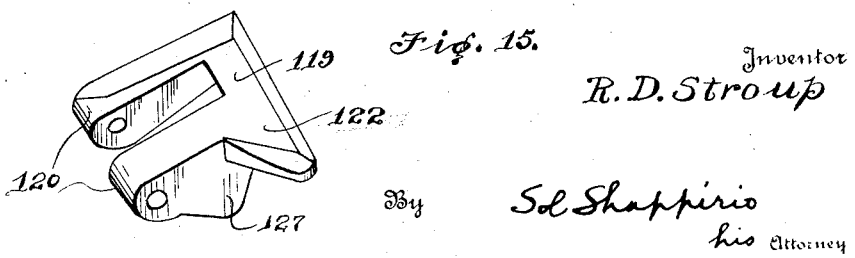
Inventor
R. D. Stroup
By Sol Shappirio
his Attorney Patented May 8, 1928.

1,668,877

UNITED STATES PATENT OFFICE.

ROBERT D. STROUP, OF MARFRANCE, WEST VIRGINIA.

BRAKE MECHANISM.

Application filed July 26, 1924. Serial No. 728,360.

This invention relates to brake mechanism and more particularly to such mechanism wherein the brake is positively locked in operative position so that it cannot be released by chance or accident until such release is directed by the engineer or other operator under whose control the mechanism is placed.

Attempts have been made in the prior art to secure a positively locked brake. It has been sought primarily to insure positive braking action to prevent, for example, runaway trains, due to failure of air pressure in air pressure operated brakes, or due to a failure of the electric circuit in electrically operated brakes, or for other reasons. It is of course obvious that in fluid pressure operated or in electrically operated brakes, if at any time there is a failure either of the fluid pressure or of the electric current as the case may be, the brakes must cease functioning. Furthermore when cars, for example freight cars are shifted from a train on to a siding, leakage of air in air pressure operated brakes, will gradually unset the brakes, so that a car standing on a grade will run away. But the devices of the prior art referred to above, which have sought to overcome these difficulties were themselves so complicated and costly that their use was impracticable, and usually these devices have proved inoperative under the strain of usual operating conditions. One of the chief reasons for this was that such prior art devices required double sets of mechanism, including air cylinders, pipe lines, etc., that is one set for locking the brakes and another set for unlocking them. The changes thus caused in such devices made them prohibitive.

In my prior applications serially numbered 653,751; 663,360; and 685,408 and filed July 25, 1923; September 18, 1923; and January 10, 1924, respectively, I have set forth certain brake mechanism designed to overcome these difficulties and to supply simple and certain structures for locking the brakes and releasing them which shall always be under the control of the engineer, and positive in operation, with emergency releasing means. This application presents further improvements on that mechanism.

Figure 1:
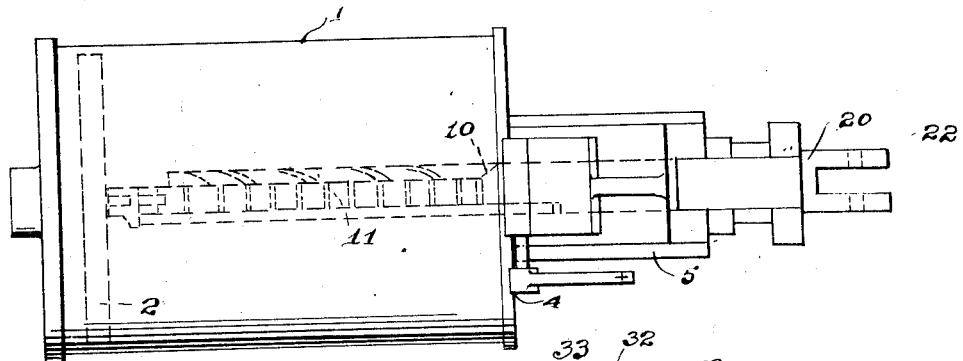
Figure 2:
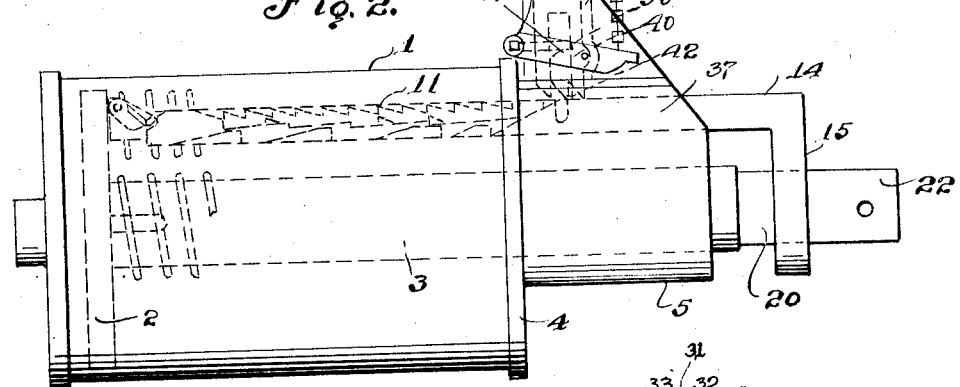
Figure 3:
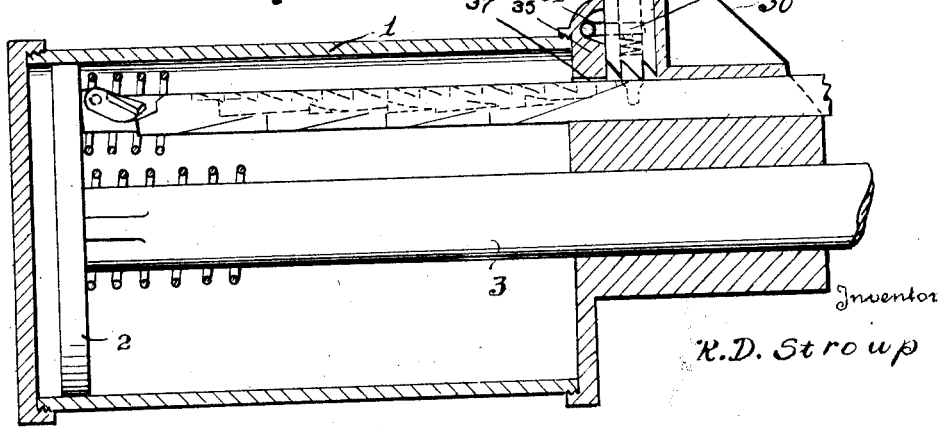

Many advantages will appear from the following more detailed description taken in conjunction with the accompanying drawings wherein there is shown by way of illustration, in Figure 1, a plan view of the assembled mechanism; in Figure 2, a side elevation of the assembled mechanism; in Figure 3, a vertical section through the center of the device; in Figure 4, a detail plan view of the holding bar with the improved releasing bar and associated parts; in Figure 5, a detail view in elevation of the parts shown in Figure 4; in Figure 6, a fragmentary view of the releasing bar in operative position; in Figure 7, a fragmentary view of the releasing dog and releasing bar the releasing bar having returned to its normal position; in Figure 8, a detail of the holding bar, locking pawl, and releasing dog in relative position; in Figure 9, a fragmentary perspective view of the end of the holding bar; in Figure 10, an end view of the assembled mechanism; in Figure 11, a detail partly in section of the locking and releasing pawls; in Figure 12, an end view of the locking pawl and releasing pawl carried by the same; in Figure 13, a perspective detail of the releasing bar; in Figure 14, a perspective detail of the releasing dog and associated parts; and in Figure 15, a perspective detail of the releasing dog.

But it will be understood that the description and drawings are to be taken as illustrative only, and not by way of limitation, since various changes may be made in the devices as illustrated and described, by those skilled in the art to which this invention appertains, without departing from the spirit and the scope of this invention.

In general it will be seen that this invention comprises exceedingly simple means for positively locking and releasing brakes which can be applied to brakes of all kinds whether operated manually, electrically, or by fluid pressure, for example, air, steam, etc. For purposes of illustration however the device will be shown in use with air pressure brakes.

In its more fundamental aspect the invention sets forth means operated by the existing air brake cylinder to lock the brake in operative position after it has been set, and means for releasing the locking mechanism also preferably operated by the same air cylinder. As a result it is possible to make use of practically the present equipment on trains with but slight modification. As set forth above, this invention may be applied to any type of brake, although it is illustrated with an air brake. In such adaptation to other forms of brakes, all that is required, is that there shall be a holding bar or its equivalent which is operated by the brake operating mechanism in its usual course of operation. This bar is then locked by the locking means, and may be subsequently released by the releasing means. It is immaterial for the purposes of the present invention whether the holding bar or its equivalent is operated by fluid pressure, electrically or otherwise. Its application to any of these brakes will be obvious from the detailed description.

Referring more particularly to the drawings there is shown by way of illustration, the conventional brake cylinder 1 within which reciprocates the usual piston 2, actuating piston rod 3, which extends through the cylinder head 4. In this modification of the invention, the usual cylinder head is replaced by one similar to that illustrated in accordance with the principles of this invention. This cylinder head 4 thus carries a small cylindrical member 5, through the opening of which the piston rod 3 extends. Upon this member 5, and preferably, there are two strips 7, 7, which may be made integral with the member 5 and preferably are so made, those strips acting to form a channel within which the holding bar 10 reciprocates.

The holding bar 10 carries a rack 11 on its upper face which extends from its inner end of the bar for about half of its length, more or less, although the exact distance is governed by other considerations or requirements, for example the minimum distance of operation before brake action shall begin. On its outer end 14, the bar 10 carries a depending ear 15 provided with an aperture or opening through which opening the brake rod link 20 passes to the brake rod, and serves to transmit the motion from the piston rod to the brake rod, whereby the brake is operated. Due to the bifurcated ear 22 of the link, by means of which it is connected to the brake rod, when the bar 10 has advanced to its locked operative position, the link cannot move inwardly, but its movement in that direction is obviously limited by the ear 15. One of the sides of the bar 10 is cut away to form a groove 100 which is beveled at 101 to the side of the bar. This groove is made to receive the releasing pawl described below.

This groove 100 with its beveled end 101 may extend for the entire length of the rack 11 on the bar 10, or for only a portion thereof. And while a groove of this character has been used in actual practice, this groove is preferably used in the following modification. Along its inner portion 102, a series of shoulders 103 are formed. From these shoulders, teeth 104 extend diagonally across the groove to its outside edge, rising at their outer ends so that they are higher at at the outer ends than at the inner ends. There will generally be as many teeth as there are shoulders 103, and the number of each may be varied at will, depending on the control desired. Five have been found in practice to give efficient results. These shoulders 103 and teeth 104 will be hereinafter referred to as "emergency points" and their function will be fully described below.

A cover plate 30 serves to form a housing for the locking pawl 40 and the releasing pawl 50. For this purpose it is provided with a vertically extending hood 31 which has vertical sides 32 and 33 forming the channel within which the locking pawl operates. The side 33 is formed as shown at 34 to provide a bearing surface for the rocking arm 73. The remainder of the channel within which the locking pawl operates, is formed from a block 35, provided on its upper side or face with the lower half of the bearing surface for the rocking arm. In the preferred form, the block 35 is integral with the cylinder head 4. The cylindrical member 5 of the cylinder head carries an opening 37 through which the bar 10 moves. The lower end of the channel referred to above is thus open to the bar 10 so that the locking pawl 40 may contact with the upper face of the bar 10.

This locking pawl 40 is cut away as shown at 41 to form an opening for the purposes described below. The pawl is beveled at its lower end 42 so that it can coact with the teeth of the rack bar 10. At one side of the pawl, a longitudinal channel 43 is cut to receive the releasing pawl 50.

The releasing pawl 50 is pivoted at 51 for transverse movement in the channel 43, the arm 35 adjacent to this pawl being cut away to allow such movement. The pawl 50 is spring pressed as shown at 54 so that in its normal position the releasing pawl presses against the side 21 of the rack bar 10, but outside of the groove 100 referred to above. In its operative position however, the pawl 50 rides in the groove 100.

The rocking arm 73 carries a lug 74 rigidly attached thereto as at 75. This lug extends within the opening 41 adjacent to the upper part thereof, so that when the rocking arm is rocked counterclockwise on its bearings, the lug serves to raise the locking pawl free of the rack on the bar 10. In order to retain the locking pawl in contact with the teeth of the holding bar 10, a block 44 held in place in any desired manner is reposed against the action of a spring 45, acting against this block and the lower edge of the opening or passageway 41, serves to press the locking pawl down against the teeth of the bar 10. The spring 45 may be retained in proper position by means of the ordinary securing devices, such as lug 46 in the block and the recess 47 in the locking pawl.

The end of the rocking arm is adapted to receive a rigidly connected arm 77 to the outer or free end of which is attached a chain or equivalent device 78, the latter being adapted to be wound up or pulled over by a vertical hand brake staff similar to that now in use on hand brakes. This arm 77 and attendant parts just referred to is purely optional, their purpose being to supply means whereby the brake may be released and restored by hand. It is obvious that when the element 78 is pulled over or wound up by the operation of the hand wheel etc., not shown, the rocking arm 73 will be operated to release the locking pawl so that the brake rod may return to its normal position under the action of the spring.

The releasing rod which forms a further feature of this specification will now be described. The releasing bar proper comprises a bar 80 cut along its lower edge to form a series of rather large, widely separated teeth 81, having corresponding notches 82. These notches have parallel cut sides 83 formed at an angle to the lower edge of the bar 80, and rising from this lower edge to their greatest point of cut at 84 where they are practically horizontal, and then dropping straight down to the bottom edge again as shown at 85. These diagonally cut edges 83 have a correspondingly cut edge 86 at the outer end of the bar 80 as shown at 87. The inner end of the bar 80 is cut to form a shoulder 88 with a beveled lower edge 89 and a beveled upper portion 90. The holding bar 10 is provided with a series of lugs 91 corresponding to the notches or recesses 82, these lugs having diagonally cut sides 92, and horizontal upper faces 93. The side of the holding bar 10 is further cut away to form a shoulder 94 against which the edge 86 of the releasing bar rests. There may be any desired number of these recesses 82 and corresponding lugs 91; for example three have proved ample in actual operation.

The holding bar 10 further carries a spring pressed plunger 110 held in its outermost position by a spring 111 wound about the reduced portion 112 of the plunger, and pressing at one end against the inner wall 113 of the opening 114 in the holding bar which forms a housing for this plunger 110. The other end of the spring rests against the shoulder 115 formed on the plunger. A pin 116 acting against shoulder 117 on the plunger limits the outermost movement of the plunger due to the action of the spring 111. The plunger is cut away at 118 to form the shoulder 117 and also so that the plunger during its reciprocating movement will clear the pin 116. The plunger 110 further carries a dog 119 having a bifurcated ear 120 pivoted on the ear 121 of the plunger 110. This dog 119 is formed with an ear 122 which rests against the shoulder 88 formed on the releasing bar 80. The holding bar 10 is cut away at its end 123 which contains the housing for the plunger to form arcuate faces 124 and 125, one of the faces such as 124 being more deeply cut as shown at 126 to receive the lug 127 carried by the corresponding bifurcation of the bifurcated ear 120. It will be apparent from the association of parts which have just been described and as further illustrated in particularly Figure 6 of the drawings, when the plunger 110 moves inwardly against the action of the spring 111, the ear 122 of the dog 119 resting against the shoulder 88 of the releasing bar 80 moves the latter in the same direction. Due to the cooperation of the recesses or notches 82 with the lugs 91, as the releasing bar moves in the direction indicated, it is raised as shown in Figure 6 and as further illustrated in Figure 11 in being raised, it raises the locking pawl 40 which extends above it, up above the rack 11 on the bar 10 thus releasing the locking mechanism. At the same time, the releasing pawl 50 will move into the groove 100 and thus maintain the locking pawl in its position out of contact with the rack 11. As the plunger continues its inward movement, the lug 127 on the ear 120 moving along the arcuate face 124 forces the dog 119 upwardly until the ear 122 is clear of the shoulder 88. As soon as this point is reached, the releasing bar 80 drops back under the influence of its own weight to its normal position. However if desired, a spring may be used to return the bar 80 to its normal position after it has been released from the action of the dog 119.

It has further been found that due to the weight of the parts, the pawl 40 may be much simplified by the omission of the spring 45 with its attendant parts. It will still retain the opening 41 which receives the lug 74 of the rocking arm 73. The pawl 40 in any event may terminate in a single beveled edge 42 or it may have several teeth 42 formed thereon which serve to give a better grip on the bar 10. The pawl 40 also carries the longitudinal channel 43 in which the releasing pawl 50 is pivoted by means of the pivot openings 51. The recess 54 forms a seat for the spring 54 which presses against the upper end of the pawl 50.

When the parts have been assembled as set forth above, it is ready for use and operates as follows. As soon as the engineer applies the brakes, the piston rod moves outwardly and by means of the brake rod, the brakes are brought into operative position. At the same time, the piston moves against the outer end of the plunger 110 and after forcing the latter in against the action of the spring 111, carries the entire holding bar out until, when the movement has been sufficient, the teeth of the rack 11 on the bar 10 engage the pawl 40, which then locks the rack and bar against inward movement. Now at this time regardless of what happens either to the air line, or within the cylinder, the brake rod is positively locked in position, so that the brakes cannot be released until the engineer under whose direction the entire mechanism is placed, desires to do so. In this way it will be seen that although the air pressure in the air line may vary, or decrease due to leakage, the brakes are positively locked so that the train cannot move until such movement is desired. In this connection attention is called to the fact that, generally, the brake rod, or piston rod, must move a minimum distance (say about three and one-half inches) for what is termed leakage groove, before the brake shall begin to operate. Advantage is taken of this fact in the present invention. The rack bar is not toothed in that part that will ride under the locking pawl during the initial travel of the bar 10 under that pawl, that is through the distance referred to above. Consequently, at this time, when the brakes are being set, while the plunger 110 will move in and raise the releasing bar 80 which will in turn raise the pawl 40, since the bar 10 is not toothed at this point, the pawl 40 will return to its normal position, and as soon as the full movement of the plunger has been made, the releasing bar 80 will likewise return to its normal position. The movement of the pawl 40 further results from the fact that the groove 100 starts at about the same point on the bar 10 as does the rack 11. When the brakes are however once set as just described, the piston and piston rod may return to their normal position and do so under the action of the spring described above, and the plunger 110 also returns to its normal position.

When however it is desired to release the brakes and allow them to cease their braking action, the engineer once more applies the brake but it is only necessary to move the piston a small distance, that is sufficient to operate the plunger 110 and move the latter inwardly against the action of the spring 111. That is, regardless of the pressure that has been used in setting the brakes, in order to unset them a minimum pressure only is required. When this is done, the releasing bar 80 is raised along the lugs 91 by the dog 119, until the locking pawl is lifted out of engagement with the rack 11. As soon as this has happened the releasing pawl 50 moves into the groove 100 and maintains the locking pawl 40 above the rack 11. The plunger continues its movement until the releasing bar 80 is disengaged from the dog 119 whereupon the releasing bar immediately drops back to its normal position. At the same time, the holding bar 10 and attendant parts are free to move back to their normal position, the pawl 50 riding in the groove 100 and still maintaining the locking pawl 40 out of operative engagement with the rack 11. If the movement continues as it does in normal operation, when the rack bar 10 has gained its normal position, the pawl 50 will have been forced out of the groove 100 by the wall 101, and will drop down to its inoperative position, allowing the pawl 40 to fall against the rack bar 10 but at a point now where there are no teeth. The parts will thus have returned to their normal inoperative position, and will be ready for a further application of the brakes when desired. Since the movements which have just been described take place immediately, there is no delay of any moment before the parts reach their normal position.

Should it become necessary at any time after the brakes have been released as just described above, and before they have regained their normal position, to apply the brakes, this may be done at once. For this purpose the emergency points referred to above have been supplied. If at any moment after the locking pawl has been released, and before the parts have returned to their normal position, it is desired to apply the brakes, the engineer starts to operate them without waiting for the parts to assume their normal position, by applying the desired pressure. The inward movement of the bar 10 will reverse itself, and begin to move outwardly. For the time being however, were it not for the emergency points, the releasing pawl 50 would continue to ride in the groove 100 and prevent the locking pawl 40 from coming into locking engagement with the rack 11. The locking pawl must therefore be restored to its contact with the rack 11 at once, and this is the function of the emergency points. As soon as the bar 10 reverses its direction of movement as just described above, the releasing pawl momentarily rides in the groove 100 until it reaches one of the shoulders 103, the shoulder reached depending on the moment of reapplication of the braking pressure. As the bar 10 then continues its movement, the pawl 50 cannot ride up over the shoulder, but is forced along the diagonally placed tooth 104 adjacent to the shoulder 103 which stopped the movement of the pawl 50, until the latter pawl reaches the outer edge of the groove 100, when it will be forced out of that groove and drop to its inoperative position. In so doing, the locking pawl 40 reengages the rack 11. It will thus be obvious that such emergency points will enable immediate locking action of the bar and brakes to be secured at any time during the releasing operation, and will be more or less controlled by the number of emergency points used.

Sometimes it is desired to release and restore the brake by hand, particularly when a car has been switched off of a train or line of cars. This is accomplished by winding up or pulling over the chain or equivalent device 78 as described above. When this is done, the rocking arm 73 will raise the pawl 40 out of engagement with the rack 11 so that the bar 10 and consequently the brake rod may return to its normal position under the action of its spring.

At times it is desirable to use this invention without the releasing pawl, and in such cases the latter with its attendant parts may be easily eliminated or removed. Such omission allows one to drop from a higher pressure to a lower one without first going through the releasing operation. This results from the fact that when the brakes have once been set and locked, when no releasing pawl 50 is used, all that is necessary is that the engineer should move the brake to the pressure that he desires to apply. As the plunger 110 is pressed inwardly against its spring 111, the releasing bar 80 will unlock the locking pawl by raising the latter above the rack 11. As soon as this happens, the "throw" on the brakes will tend to restore the parts to their normal position. This throwing action is due to the normal resistance of the brakes. As soon however, as the brake rod and piston rod move back to a point where the bar 10 has been locked they cannot move further. The bar 10 becomes locked due to the fact that after releasing the pawl 40, the releasing bar 80 soon reaches the point where the dog 119 disengages the shoulder 88, and the releasing bar returns to its normal position. The locking pawl 40 thus drops down and locks the bar 10 at the point to which it has returned due to the throwing action of the brakes while the pawl 40 has been raised out of contact with the rack 11. Since the pressure on the piston has been only partially released the locking bar 10 cannot return due to the throwing action to anything but an immediate position, determined by the lower pressure which the engineer has applied. In this way the brakes may be locked at any lower pressure position.

The cover plate 30 serves to protect the working parts against the entrance of dirt etc., and may also be provided with oil cups etc. for lubrication of the working parts. It is thus seen that all of the moving parts are contained within the cylinder.

Having thus set forth my invention, I claim:

1. In brake mechanism, means for locking the brake against movement, means for releasing said locking means, and emergency means for unsetting the releasing means.

2. In brake mechanism, means for holding the brake against movement, locking means operated by said brake holding means, to lock the holding means in operative position, and releasing means to release the said locking means.

3. In brake mechanism, means for holding the brake against movement, locking means operated by said brake holding means, to lock the holding means in operative position, and releasing means to release the said locking means comprising a reciprocable bar adapted to maintain the locking means temporarily in inoperative position.

4. In brake mechanism, a fluid pressure cylinder, a piston within said cylinder operating under the fluid pressure in said cylinder, means for holding the brake in set position, locking means operated by said piston to lock said holding means, and means for releasing said locking means operated by said piston.

5. In brake mechanism, a fluid pressure cylinder, a piston within said cylinder operating under the fluid pressure in said cylinder, means for holding the brake in set position, locking means operated by said piston to lock said holding means, and means for releasing said locking means operated by said piston, and emergency means for releasing said releasing means operated by said piston.

6. In brake mechanism, a brake, means for setting said brake in operative position, means operated by said setting means for locking said brake in any set position, means operated by said setting means for releasing said locking means, and emergency means for unsetting said releasing means.

7. In brake mechanism, a brake, means for setting said brake in operative position, means operated by said setting means for locking said brake in any set position, and means carried by said locking means for releasing the latter.

8. In brake mechanism, a brake, means for setting said brake in operative position, means operated by said setting means for locking said brake in any set position, and means operated by said setting means for releasing said locking means.

9. In brake mechanism, a reciprocable holding bar, means for locking said holding bar on initial movement thereof, means for releasing said locking means, and means for maintaining the locking means temporarily in inoperative position and simultaneously placing the releasing means in operative position.

10. In brake mechanism, a holding bar provided with a rack, a pawl engaging said rack to lock said bar against movement in one direction, a groove in said bar, a releasing pawl carried by said locking pawl and adapted to ride in said groove and to keep the locking pawl from operative engagement with the said rack, a releasing bar adjacent said holding bar adapted on movement to hold the locking pawl temporarily out of operative position and to set the releasing pawl in the groove aforesaid, and a dog on said holding bar adapted on movement of said holding bar, to bring the releasing bar into operative position.

11. In brake mechanism wherein the brakes are locked in their operative position, means for releasing said locking means operative in any position of the locked brakes.

12. In brake mechanism including means for locking the brakes operated by means for holding the brakes in the locked position, means for releasing said locking means.

13. In brake mechanism including means for locking the brakes in any set position, and means for releasing said locking means, means providing for emergency unsetting of the releasing means.

ROBERT D. STROUP.